(12) United States Patent
Singh (10) Patent No.: US 12,526,713 B2
(45) Date of Patent: Jan. 13, 2026

(54) OPTIMIZING CONTRIBUTION OF SECONDARY CELL UNDER CARRIER AGGREGATION IN WIRELESS NETWORK

(71) Applicant: Rakuten Symphony, Inc., Tokyo (JP)

(72) Inventor: Ajeetkumar Singh, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 399 days.

(21) Appl. No.: 18/041,706

(22) PCT Filed: Dec. 23, 2022

(86) PCT No.: PCT/US2022/053937
§ 371 (c)(1),
(2) Date: Feb. 15, 2023

(87) PCT Pub. No.: WO2024/102148
PCT Pub. Date: May 16, 2024

(65) Prior Publication Data
US 2024/0323789 A1    Sep. 26, 2024

(30) Foreign Application Priority Data

Nov. 9, 2022 (IN) .............................. 202221064012

(51) Int. Cl.
*H04W 36/22* (2009.01)
*H04W 24/02* (2009.01)
*H04W 36/00* (2009.01)

(52) U.S. Cl.
CPC ........... *H04W 36/22* (2013.01); *H04W 24/02* (2013.01); *H04W 36/00692* (2023.05)

(58) Field of Classification Search
CPC ..... H04W 16/14; H04W 16/02; H04W 16/04; H04W 24/08; H04W 24/02;
(Continued)

(56) References Cited

U.S. PATENT DOCUMENTS

2020/0154287 A1* 5/2020 Novlan ............. H04W 36/0069
2020/0351698 A1* 11/2020 Li .......................... H04W 4/00

OTHER PUBLICATIONS

International Search Report issued Apr. 24, 2023 in International Application No. PCT/US 22/53937.
(Continued)

*Primary Examiner* — Jinsong Hu
*Assistant Examiner* — Farideh Madani
(74) *Attorney, Agent, or Firm* — Sughrue Mion, PLLC (57) ABSTRACT

Embodiments herein disclose a method and electronic device (200) for optimizing a contribution of a secondary cells (400) under carrier aggregation (CA) in a wireless network. The method further includes receiving a plurality of CA Key Performance Indicators (KPIs) of the secondary cells (400) for a period of time. The method further includes determining a CA offload ratio of the secondary cells (400) and a primary cell associated with the at least one secondary cell based on the plurality of CA KPIs. The method further includes detecting a contribution of the secondary cells (400) including zero contribution, low contribution or high contribution in the wireless network based on the determined the CA offload ratio. The method further includes providing mitigation plans and high load plans based on the contribution of the secondary cells.

20 Claims, 5 Drawing Sheets

(58) Field of Classification Search
CPC .. H04W 36/00692; H04W 36/22; H04L 5/14;
H04L 5/001
See application file for complete search history.

(56) References Cited

OTHER PUBLICATIONS

Written Opinion issued Apr. 24, 2023 in International Application No. PCT/US 22/53937.

* cited by examiner

OPTIMIZING CONTRIBUTION OF SECONDARY CELL UNDER CARRIER AGGREGATION IN WIRELESS NETWORK

CROSS REFERENCE TO RELATED APPLICATIONS

This application is a National Stage of International Application No. PCT/US2022/053937 filed on Dec. 23, 2022, claiming priority based on Indian Patent Application number 202221064012 filed on Nov. 9, 2022.

FIELD OF INVENTION

The embodiments herein relate to an electronic device, and more particularly relates to a method and an electronic device for optimizing a contribution of secondary cells under Carrier Aggregation (CA) in a wireless network.

BACKGROUND OF THE INVENTION

Generally, carrier Aggregation play a vital role in the evolution of wireless communication. In carrier aggregation technique user equipment is connected with a primary cell and a one or more secondary cells where frequency bands from one or more secondary cells are combined with a frequency bands of the primary cell to offer more bandwidth which results in faster data speed to a user. However the combined bandwidth does not result in a faster data speed to the user due to the low or zero contribution by the secondary cells in the carrier aggregation.

Hence there is a high demand for detecting and analyzing low or zero contributed secondary cells used in carrier aggregation.

The conventional methods for detecting and analyzing low contributed secondary cells used in carrier aggregation are not automated, where people needs to manually analyze the Key Performance Indicator (KPI) data to identify the low contributed secondary cell which reduces productivity, increased usage of the labors, low quality in identifying the low or zero contributed secondary cells and increased analyzing time.

Thus, it is desired to address the above mentioned disadvantages or other shortcomings or at least provide a useful alternative.

OBJECT OF INVENTION

The principal object of the embodiments herein is to provide a method and an electronic device for optimizing a contribution of secondary cells under carrier aggregation (CA) in a wireless network to increase productivity of a wireless network.

Another object of the embodiments herein is to determine a CA offload ratio of the secondary cells and a primary cell associated with the secondary cells based on the plurality of CA Key Performance Indicators (KPIs) to identify a contribution of the secondary cells including zero contribution, low contribution or high contribution in the wireless network, which results in less usage of labors and also better quality in identifying the contribution of the secondary cells.

Another object of the embodiments herein is to provide a mitigation plans and a high load plans based on the contribution of the secondary cells which reduces the time for analyzes and troubleshooting.

SUMMARY

Accordingly, the embodiments herein disclose an electronic device for optimizing a contribution of a secondary cells under a carrier aggregation (CA) in a wireless network, the electronic device includes a memory, a processor and a cell contribution controller, communicatively coupled to the memory and the processor. The cell contribution controller is configured to receive a plurality of CA Key Performance Indicators (KPIs) of the secondary cells for a period of time and determine a CA offload ratio of the secondary cells and a primary cell associated with the secondary cells based on the plurality of CA KPIs. The cell contribution controller is further configured to detect the secondary cells has zero contribution in the wireless network when the CA offload ratio is zero.

In an embodiment, the cell contribution controller configured to determine a mitigation plan for the secondary cell with one of the zero contribution and a low contribution, wherein the mitigation plan is determined based on the CA offload ratio of the at least one secondary cell and a load level on the at least one secondary cell. Further the cell contribution controller is configured to display the mitigation plan to be performed to optimize contribution of the one secondary cell in the wireless.

Accordingly, the embodiments herein disclose a method for optimizing the contribution of the secondary cells under CA in the wireless network. The method further includes receiving the plurality of CA KPIs of the secondary cells for the period of time and determining the CA offload ratio of the secondary cells and the primary cell associated with the secondary cells based on the plurality of CA KPIs. The method further includes detecting the secondary cells has zero contribution in the wireless network when the offload ratio is zero and detecting the secondary cells has the low contribution in the wireless network when the offload ratio meet the offload ratio threshold. The method further includes detecting the secondary cells has high contribution in the wireless network when the offload ratio does not meet the offload ratio threshold.

In an embodiment, determining the mitigation plan for the secondary cells with one of the zero contribution and the low contribution, where the mitigation plan is determined based on the CA offload ratio of the secondary cells and the load level on the secondary cells. The method further includes displaying the mitigation plan to be performed to optimize contribution of the secondary cells in the wireless.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be constructed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for optimizing a contribution of secondary cells under carrier aggregation (CA) in a wireless network. The method further includes receiving a plurality of CA Key Performance Indicators (KPIs) of the secondary cells for a period of time and determining a CA offload ratio of the secondary cells and a primary cell associated with the secondary cells based on the plurality of CA KPIs. The method further includes detecting the secondary cells has zero contribution in the wireless network when the offload ratio is zero and detecting the secondary cells has a low contribution in the wireless network when the offload ratio meet the offload ratio threshold. The method further includes detecting the secondary cells has high contribution in the wireless network when the offload ratio does not meet the offload ratio threshold.

Accordingly, the embodiments herein disclose the electronic device for optimizing the contribution of at least one secondary cells under carrier aggregation (CA) in the wireless network, the electronic device includes a memory, a processor and a cell contribution controller, communicatively coupled to the memory and the processor. The cell contribution controller is configured to receive the plurality of CA Key Performance Indicators (KPIs) of the secondary cells for the period of time and determine the CA offload ratio of the secondary cells and the primary cell associated with the secondary cells based on the plurality of CA KPIs. The cell contribution controller is further configured to detect the secondary cells has zero contribution in the wireless network when the offload ratio is zero. The cell contribution controller is further configured to detect the secondary cells has the low contribution in the wireless network when the offload ratio meet the offload ratio threshold; and The cell contribution controller is further configured to detect the secondary cells has high contribution in the wireless network when the offload ratio does not meet the offload ratio threshold.

Accordingly, the embodiments herein disclose system for optimizing the contribution of at least one secondary cells under carrier aggregation (CA) in the wireless network, the system includes the primary cell, at least one primary cell connected to the secondary cell; and the electronic device connected to the primary cell and the secondary cell, where the electronic device comprises the cell contribution controller configured to receive the plurality of CA Key Performance Indicators (KPIs) of the secondary cells for the period of time and determine the CA offload ratio of the secondary cells and the primary cell associated with the secondary cells based on the plurality of CA KPIs. The cell contribution controller is further configured to detect the secondary cells has zero contribution in the wireless network when the offload ratio is zero. The cell contribution controller is further configured to detect the secondary cells has the low contribution in the wireless network when the offload ratio meet the offload ratio threshold; and The cell contribution controller is further configured to detect the secondary cells has high contribution in the wireless network when the offload ratio does not meet the offload ratio threshold.

In existing systems, low contributed secondary cells are identified by manual effects, where operator needs to manually analyze the KPI data to identify a contribution of the secondary cells.

Unlike existing systems, the proposed system and method automatically analyze the KPI data to identify the contribution of the secondary cells.

Unlike existing system, the proposed system and method can identify and classify the secondary cells automatically based on the contribution. The classification based on the contribution includes low contribution secondary cells, no contribution secondary cells and high contribution secondary cells. The proposed system provides advantages including increased productivity, less usage of the labors, better quality in identify the low contributed secondary cells than the existing system, reduced analyzing time.

Referring now to the drawings, and more particularly to FIG. 1 through FIG. 5, there are shown preferred embodiments.

Figure 1:
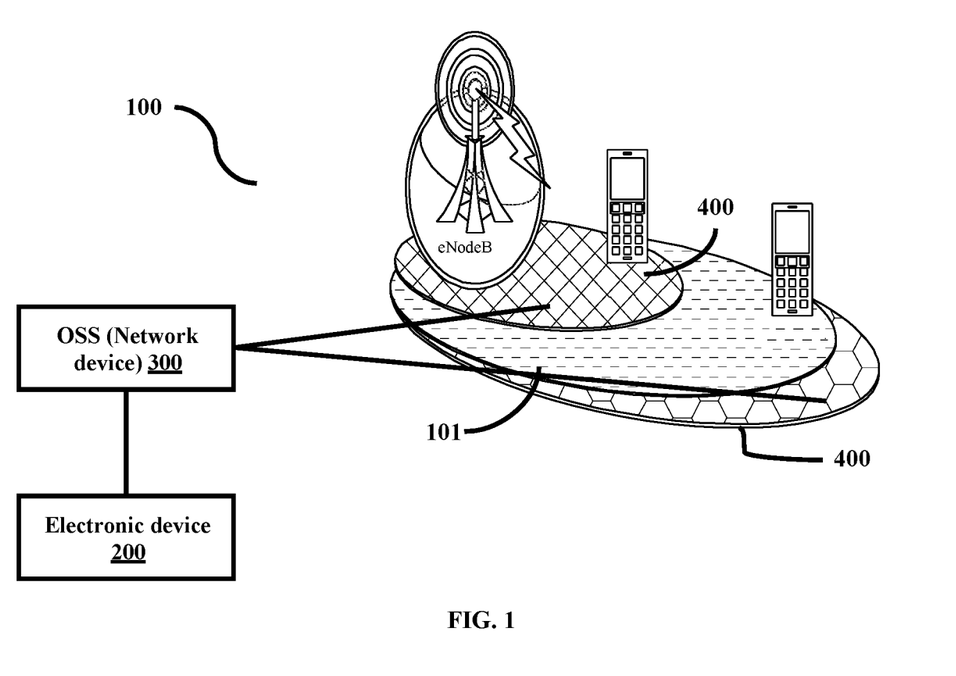
FIG. 1 is a schematic diagram illustrating a primary and a secondary cells connected with an operational support system (network device), according to the embodiments as disclosed herein.

FIG. 1 is a schematic diagram illustrating a primary and a secondary cells (400) connected with an operational support system (network device) in a wireless network, according to the embodiments as disclosed herein.

The Operational Support System (OSS) is otherwise called as a network device (300). The primary cell (101) and the secondary cells (400) are connected with the OSS (network device) (300) in the wireless network (100).

The network device (300) monitors a plurality of KPIs associated with the secondary cells (400) over a period of time; and store the plurality of KPIs associated with the secondary cells (400) over the period of time in a database.

The network device (300) receives a request for KPI from an electronic device (200). Further, the network device (300) responds a KPI response comprising the plurality of KPIs associated with the secondary cells (400) over the period of time from the network device (300).

Figure 2:
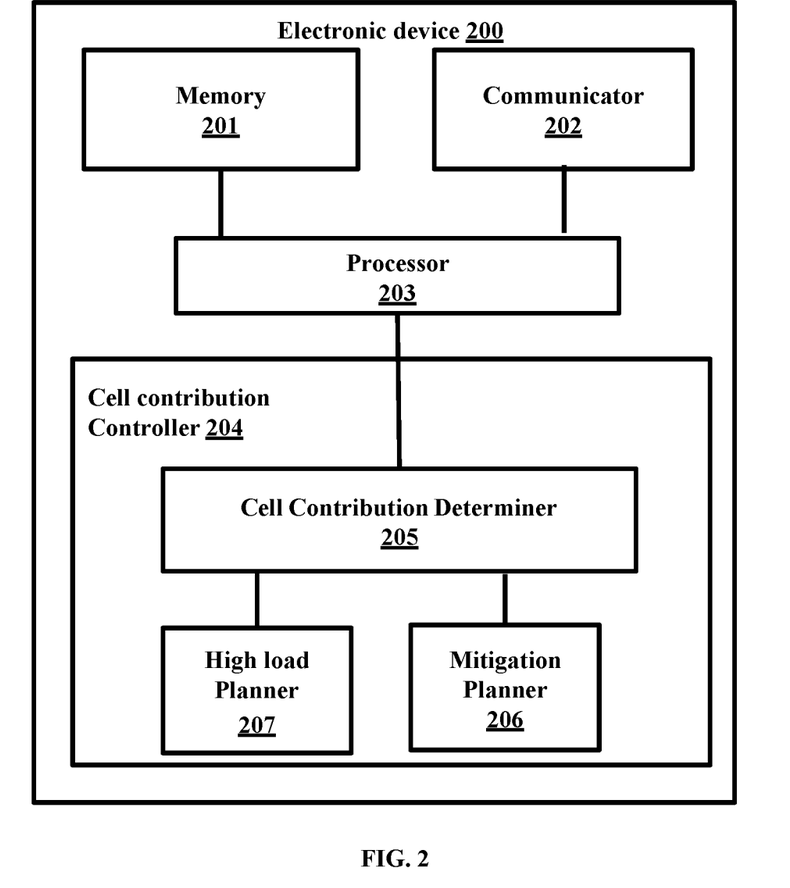
FIG. 2 is a block diagram of an electronic device for optimizing a contribution of the secondary cells under CA in a wireless network, according to the embodiments as disclosed herein.

FIG. 2 is a block diagram of the electronic device (200) for optimizing a contribution of the secondary cells (400) under CA in the wireless network, according to the embodiments as disclosed herein.

Referring to FIG. 2, examples of the electronic device (200) include, but are not limited to a laptop, a palmtop, a desktop, a mobile phone, a smartphone, Personal Digital Assistant (PDA), a tablet, a wearable device, an Internet of Things (IoT) device, a virtual reality device, a foldable device, a flexible device, an immersive system, etc.

In an embodiment, the electronic device (200) includes a memory (201), a processor (203), a communicator (202), and a cell contribution controller (204).

The memory (201) stores instructions to be executed by the processor (203). The memory (201) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (201) may, in some examples, be considered a non-transitory storage medium. The term "non-transitory" may indicate that the storage medium is not embodied in a carrier wave or a propagated signal. However, the term "non-transitory" should not be interpreted that the memory (201) is non-movable. In some examples, the memory (201) can be configured to store larger amounts of information than its storage space. In certain examples, a non-transitory storage medium may store data that can, over time, change (e.g., in Random Access Memory (RAM) or cache). The memory (201) can be an internal storage unit or it can be an external storage unit of the electronic device (200), a cloud storage, or any other type of external storage.

The processor (203) is configured to execute instructions stored in the memory (201). The processor (203) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (203) may include multiple cores to execute the instructions.

The communicator (202) is configured for communicating internally between hardware components in the electronic device (200). Further, the communicator (202) is configured to facilitate the communication between the electronic device (200) and other devices via one or more networks (e.g. Radio technology). The communicator (202) includes an electronic circuit specific to a standard that enables wired or wireless communication.

The processor (203) is coupled with other processor such as cell contribution controller (204) to perform the embodiment.

The cell contribution controller (204) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The cell contribution controller (204) includes a cell contribution determiner (205), high-load planner (207) and a mitigation planner (206). The cell contribution determiner (205) receives a plurality of CA Key Performance Indicators (KPIs) of the secondary cells (400) for a period of time. The cell contribution determiner (205) determines a CA offload ratio of the secondary cells (400) and the primary cell associated with the secondary cells (400) based on the plurality of CA KPIs. The cell contribution determiner (205) further determines whether the offload ratio is zero or meets an offload ratio threshold. The cell contribution determiner (205) further detects the secondary cells (400) has zero contribution in the wireless network when the offload ratio is zero. The cell contribution determiner (205) further detects the secondary cells (400) has a low contribution in the wireless network when the offload ratio meets the offload ratio threshold. The cell contribution determiner (205) further detects the secondary cells (400) has high contribution in the wireless network when the offload ratio does not meet the offload ratio threshold.

The CA offload ratio is comprises the ratio of traffic of the primary cell and secondary cell. The traffic percentage wise contribution of the secondary cells (400) are calculated based on the CA offload ratio. Below mentioned is the example for the CA offload ratio in percentage.

| CA offload Ratio(%) | Total Secondary cell |
|---|---|
| 0-5 | 454 |
| 5 to 10 | 375 |
| 10 to 15 | 1010 |
| 15 to 20 | 2402 |

The high-load planner (207) determines a high-load cell plan for the secondary cells (400) with the high contribution. The high-load cell plan is determined based on the CA offload ratio of the secondary cells (400) and a load level on the secondary cells (400) and display the high-load cell plan to be performed to optimize contribution of the secondary cells (400) in the wireless network, where the high-load cell plan comprises at least one of addition of at least one new cell in the wireless network and a capacity planning of the secondary cells (400).

The mitigation planner (206) determines a mitigation plan for the secondary cells (400) with one of the zero contribution and the low contribution. The mitigation plan is determined based on the CA offload ratio of the secondary cells (400) and the load level on the secondary cells (400). The mitigation planner (206 allows the electronic device to display the mitigation plan to be performed to optimize contribution of the secondary cells (400) in the wireless. In one embodiment, the mitigation plan is generated in a report format. Example information provided in the report among other things is shown below:

| Load level | CA KPIs | Traffic offload ratio in percentage | Mitigation plan |
|---|---|---|---|
| High Load | 43.61 | 3.5% | Vertical Mismatch |
| Low Load | 40.35 | 10% | No action required |
| Medium Load | 28.5 | 4% | Drive test required |

The mitigation planner (206) determines a mitigation plan, for the secondary cells (400) with the zero contribution in the wireless network, comprises at least one of activation of Down Link (DL) CA by the secondary cells (400), identifying unique relation between primary and secondary cells (400) using the CA relation ID (CAREL).

The mitigation planner (206) determines a load of the secondary cells (400) in the wireless network greater than a load threshold. The mitigation planner (206) further determines a number of CA configured User Equipment (UE) associated with the secondary cells (400) when the load of the secondary cells (400) in the wireless network greater than the load threshold. The mitigation planner (206) determines whether the number of CA configured UE meets a maximum CA configured UE threshold and determines the mitigation plan for the secondary cells (400) when the number of CA configured UE meets the maximum CA configured UE threshold, wherein the mitigation plan comprises an extended secondary cells (400) CA capability parameter change to extend a capability of the secondary cells (400).

The mitigation planner (206) determines a contribution of the primary cell when the number of CA configured UE does not meet the maximum CA configured UE threshold. Further the mitigation planner (206) determines whether the contribution of the primary cell meets a primary cell contribution threshold and displays no action required as higher Non-CA configured UE is available on the secondary cells (400).

The mitigation planner (206) determines a horizontal coverage mismatch when the contribution of the primary cell does not meet the primary cell contribution threshold. Further mitigation planner (206) determines the mitigation plan for the secondary cells (400) based on the horizontal coverage mismatch, wherein the mitigation plan comprises configuring one of an antenna design, an antenna power, and an antenna orientation.

The mitigation planner (206) is determines horizontal coverage based on a Timing advance of both the primary cell and the secondary cells (400).

The mitigation planner (206) determines a vertical coverage mismatch when the contribution of the primary cell does not meet the primary cell contribution threshold. Further the mitigation planner (206) determines the mitigation plan for the secondary cells (400) based on the vertical coverage mismatch, wherein the mitigation plan comprises an onsite visit to confirm antenna parameters.

The mitigation planner (206) determines horizontal coverage based on a handover direction from cell to cell in the wireless network.

Figure 3:
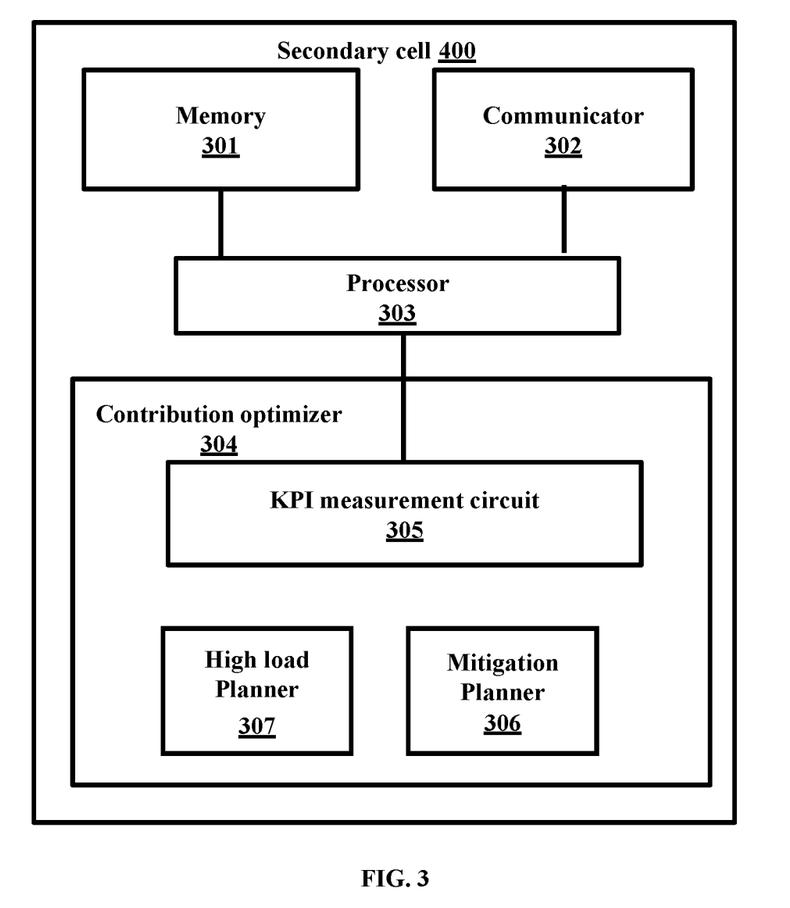
FIG. 3 is a block diagram of the secondary cells under the CA in the wireless network, according to the embodiments as disclosed herein.

FIG. 3 is a block diagram of the secondary cells (400) under the CA in the wireless network, according to the embodiments as disclosed herein.

Referring to FIG. 3, examples of the secondary cells (400) include, but are not limited to a base station, radio node, eNodeB (eNB), etc.

In an embodiment, the secondary cells (400) includes a memory (301), a processor (303), a communicator (302), and a contribution optimizer (304).

The memory (301) stores instructions to be executed by the processor (303). The memory (301) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (301) may, in some examples, be considered a non-transitory storage medium. The term "non-transitory" may indicate that the storage medium is not embodied in a carrier wave or a propagated signal. However, the term "non-transitory" should not be interpreted that the memory (301) is non-movable. In some examples, the memory (301) can be configured to store larger amounts of information than its storage space. In certain examples, a non-transitory storage medium may store data that can, over time, change (e.g., in Random Access Memory (RAM) or cache). The memory (301) can be an internal storage unit or it can be an external storage unit of the electronic device (200), a cloud storage, or any other type of external storage.

The processor (303) is configured to execute instructions stored in the memory (301). The processor (303) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (303) may include multiple cores to execute the instructions.

The communicator (302) is configured for communicating internally between hardware components in the electronic device (200). Further, the communicator (302) is configured to facilitate the communication between the electronic device (200) and other devices via one or more networks (e.g. Radio technology). The communicator (302) includes an electronic circuit specific to a standard that enables wired or wireless communication.

The processor (303) is coupled with other processor such as contribution optimizer (304) to perform the embodiment.

A contribution optimizer (304) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The contribution optimizer (304) includes a KPI measurement circuit (305), a high-load planner (307) and a mitigation planner (306). The KPI measurement circuit (305) measures the contribution levels and related information. The KPI measurement circuit (305) sends the measured information to the network device (300). The network device (300) stores the the KPIs for the electronic device (200). The high-load planner (307) optimizes the contribution of the secondary cells (400) based on the instructions which is receives from the high-load planner (207) of the electronic device (200). The mitigation planner (306) optimizes the contribution of the secondary cells (400) based on the instructions which is received from the mitigation planner (206) of the electronic device (200).

The contribution optimizer (304) receives the mitigation plan from the electronic device (200) and optimizing the contribution of the secondary cells (400) in the wireless network by applying the mitigation plan at the secondary cells (400) for the one of the zero contribution or the low contribution secondary cells (400).

The mitigation plan at the secondary cells (400) comprises: The first mitigation plan at least one of activating a Down Link (DL) CA at the secondary cells (400), checking CAREL and limiting the CAREL due to cells not collocated, when the secondary cells (400) has zero contribution in the wireless network. The second mitigation plan is extending the secondary cells (400) CA capability parameter change to extend a capability of the secondary cells (400) when the secondary cells (400) has the low contribution in the wireless network. The third mitigation plan is configuring one of an antenna design, an antenna power, and an antenna orientation when the secondary cells (400) has the low contribution in the wireless network.

Figure 4:
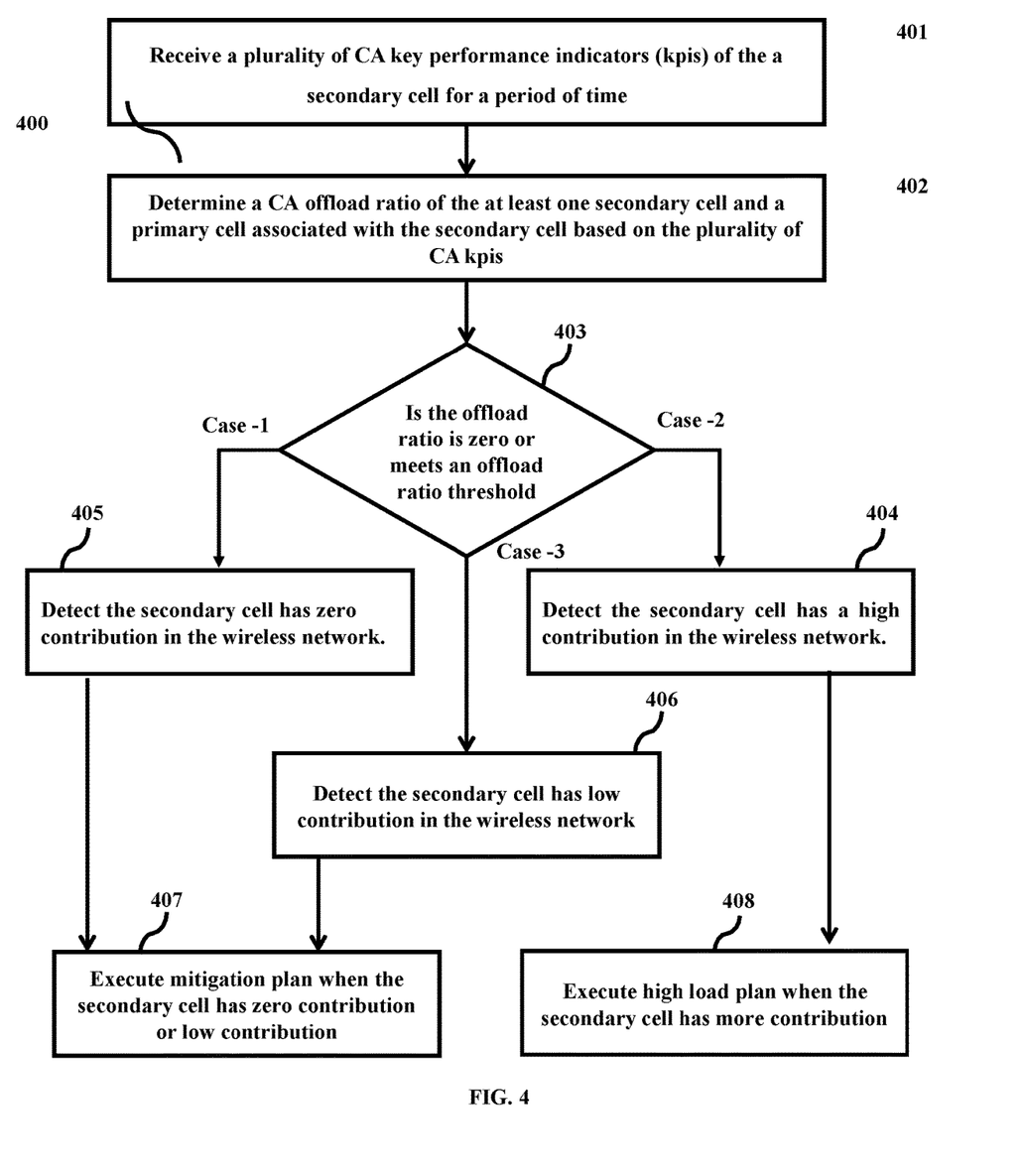
FIG. 4 is a flow diagram illustrating a method for optimizing the contribution of the secondary cells under the CA in the wireless network, according to the embodiments as disclosed herein.

FIG. 4 is a flow diagram (400) illustrating a method for optimizing the contribution of the secondary cells (400) under the CA in the wireless network, according to the embodiments as disclosed herein.

The step 401 to step 408 of the flow diagram (400) are performed by the electronic device (200).

At step 401, the electronic device (200) receives the plurality of CA Key Performance Indicators (KPIs) of the secondary cells (400) for a period of time.

At step 402, the electronic device (200) determines the CA offload ratio of the secondary cells (400) and a primary cell associated with the secondary cells (400) based on the plurality of CA KPIs.

At step 403, the electronic device (200) determines whether the offload ratio is zero or meets the offload ratio threshold.

At step 404, the electronic device (200) detects the secondary cells (400) has the high contribution in the wireless network when the offload ratio threshold is met (case 2).

At step 405, the electronic device (200) detects the secondary cells (400) has zero contribution in the wireless network when the offload ratio is zero (case 1).

At step 406, the electronic device (200) detects the secondary cells (400) has low contribution in the wireless network when the offload ratio threshold is not met (case 3).

At step 407, the electronic device (200) executes the mitigation plan when the secondary cells (400) has the zero contribution or the low contribution.

At step 408, the electronic device (200) executes the high-load plan when the secondary cells (400) has more contribution.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 5:
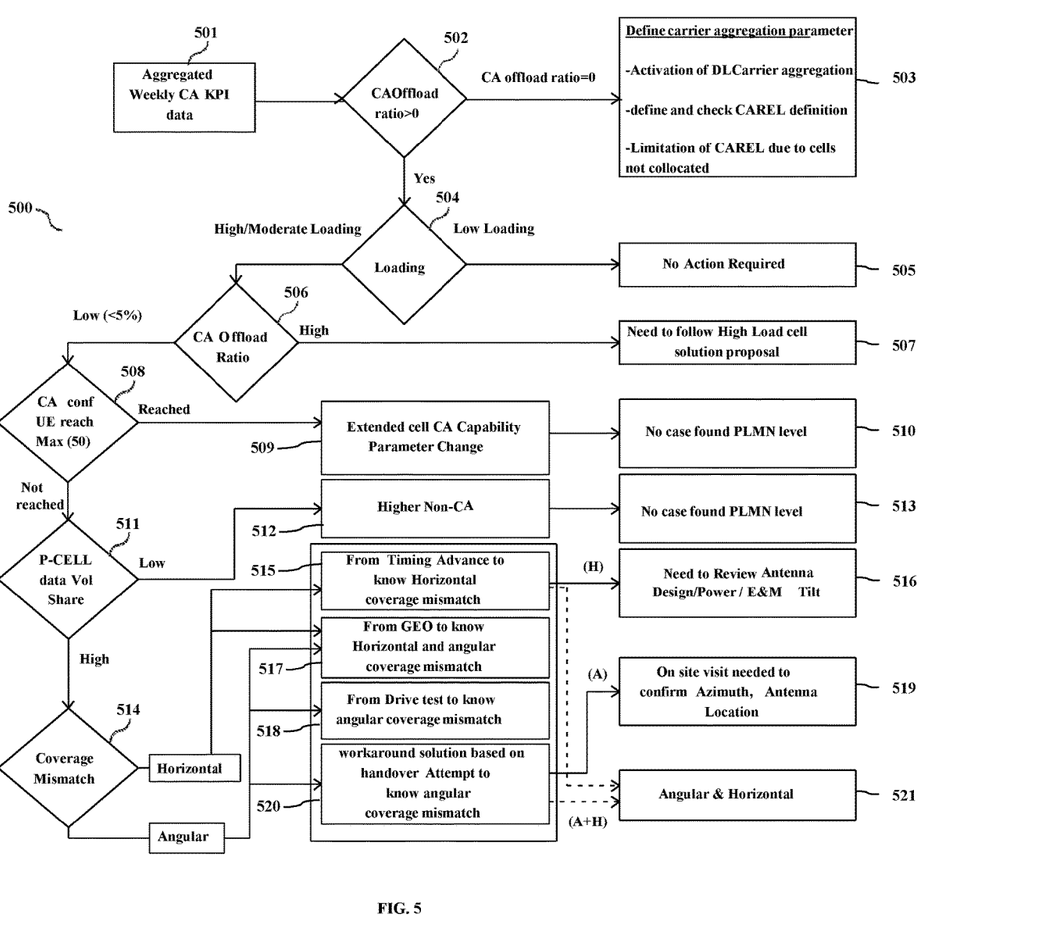
FIG. 5 is a flow chart illustrating a process involved in identifying the contribution of the secondary cells and providing mitigation plans, according to the embodiments as disclosed herein.

FIG. 5 is a flow chart (500) illustrating a process involved in identifying the contribution of the secondary cells (400) and providing the mitigation plans, according to the embodiments as disclosed herein.

In the flow chart (500), at step 501, the electronic device (200) receives the plurality of CA Key Performance Indicators (KPIs) of the secondary cells (400) for the period of time.

At step 502, the electronic device (200) determines a CA offload ratio of the secondary cells (400) and a primary cell associated with the secondary cells (400) based on the plurality of CA KPIs.

At step 503, the electronic device (200) provides the mitigation plan, for the secondary cells (400) with the zero contribution in the wireless network, comprises at least one of activation of Down Link (DL) CA by the secondary cells (400), identifying unique relation between primary and secondary cells (400) using the CA relation ID (CAREL).

At step 504, the electronic device (200) determines whether the load of the secondary cells (400) is low or moderate or high-loading.

At step 505, the electronic device (200) performs no action when the load of the secondary cells (400) is low.

At step 506, the electronic device (200) determines whether the CA off load ratio is low or high, when the load of the secondary cells (400) is moderate or high.

At step 507, the electronic device (200) provides a high-load cell plan for the secondary cells (400) when the CA offload ratio is high, where the high-load cell plan comprises at least one of addition of at least one new cell in the wireless network and a capacity planning of the secondary cells (400).

At step 508, the electronic device (200) determine a number of CA configured User Equipment (UE) associated with the secondary cells (400) when the CA offload ratio is low.

At step 509, the electronic device (200) provides a mitigation plan for the secondary cells (400) when the number of CA configured UE meets the maximum CA configured UE threshold, where the mitigation plan comprises an extended secondary cells (400) CA capability parameter change to extend a capability of the secondary cells (400).

At step 510, the electronic device (200) displays no case found PLMN level as a part of mitigation plan.

At step 511, the electronic device (200) determines whether the contribution of the primary cell meets a primary cell contribution threshold when the number of CA configured UE does not meet the maximum CA configured UE threshold.

At step 512, the electronic device (200) displays no action required as higher Non-CA configured UE is available on the secondary cells (400).

At step 513, the electronic device (200) displays no case found PLMN level as a part of mitigation plan.

At step 514, the electronic device (200) detects coverage mismatch when the contribution of the primary cell does not meets a primary cell contribution threshold.

At step 515, the electronic device (200) determine a horizontal mismatch coverage based on a timing advance of both the primary cell and the secondary cells (400) when coverage mismatch is detected.

At step 516, the electronic device (200) configures one of an antenna design, an antenna power, and an antenna orientation for the secondary cells (400) based on the horizontal coverage mismatch, when the coverage mismatch is detected.

At step 517, the electronic device (200) determines the horizontal and the vertical mismatch coverage is based on larger coverage gap between 2 layers, when the coverage mismatch is detected.

At step 518, the electronic device (200) determines the vertical mismatch based on a drive test, when a coverage mismatch is detected.

At step 519, the electronic device (200) performs the mitigation plan for the secondary cells (400) based on the vertical coverage mismatch, where the mitigation plan comprises an onsite visit to confirm antenna parameters.

At step 520, the electronic device (200) determines the vertical coverage mismatch based on a handover attempt due to handover direction from cell to cell in the wireless network. if a cell is doing handover to its forward neighbor, score will be positive. if cell is doing handover to backward side, score will be negative. During analysis, any cells having negative score considered as vertical mismatch case.

At step 521, vertical and horizontal mismatch is determined based on the handover attempt and timing advance.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Accordingly, the embodiments herein disclose the electronic device (200) for optimizing the contribution of at least one secondary cells under CA in the wireless network. The cell contribution determiner (205) receives a plurality of CA Key Performance Indicators (KPIs) of the secondary cells (400) for a period of time. The cell contribution determiner (205) determines a CA offload ratio of the secondary cells (400) and the primary cell associated with the secondary cells (400) based on the plurality of CA KPIs. The cell contribution determiner (205) further detects the secondary cells (400) has zero or low contribution in the wireless network based on the offload ratio. The cell contribution controller configured to determine a mitigation plan for the secondary cell with one of the zero contribution and a low contribution. The embodiment have advantages including automatically analyzing the KPI data to identify the zero or low contributed secondary cell which increases productivity, reduces usage of the labors, high quality in identifying the low or zero contributed secondary cells with less analyzing time.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. An electronic device for optimizing a contribution of at least one secondary cell under Carrier Aggregation (CA) in a wireless network, wherein the electronic device comprises:
   a memory;
   a processor coupled to the memory and the processor configured to:
      receive a plurality of CA Key Performance Indicators (KPIs) of the at least one secondary cell for a period of time;
      determine a CA offload ratio of the at least one secondary cell and a primary cell associated with the at least one secondary cell based on the plurality of CA KPIs;
      determine whether the offload ratio is zero or meets an offload ratio threshold;
      perform one of:
         detect the at least one secondary cell has zero contribution in the wireless network when the offload ratio is zero;
         detect the at least one secondary cell has a low contribution in the wireless network when the offload ratio meet the offload ratio threshold; and
         detect the at least one secondary cell has high contribution in the wireless network when the offload ratio does not meet the offload ratio threshold; and
      determine a mitigation plan for the at least one secondary cell with one of the zero contribution and the low contribution.

2. The electronic device as claimed in claim 1, wherein:
   the mitigation plan is determined based on the CA offload ratio of the at least one secondary cell and a load level on the at least one secondary cell; and
   the processor is configured to display the mitigation plan to be performed to optimize contribution of the at least one secondary cell in the wireless, wherein the mitigation plan, for the at least one secondary cell with the zero contribution in the wireless network, comprises at least one of activation of Down Link (DL) CA by the at least one secondary cell, identifying unique relation between primary and secondary cell using the CA relation ID (CAREL).

3. The electronic device as claimed in claim 2, wherein the processor is configured to, in determining the mitigation plan for the at least one secondary cell with the low contribution in the wireless network:
   determine a load of the at least one secondary cell in the wireless network greater than a load threshold;
   determine a number of CA configured User Equipment (UE) associated with the at least one secondary cell when the load of the at least one secondary cell in the wireless network greater than the load threshold;
   determine whether the number of CA configured UE meets a maximum CA configured UE threshold; and
   determine the mitigation plan for the at least one secondary cell when the number of CA configured UE meets the maximum CA configured UE threshold, wherein the mitigation plan comprises an extended secondary cell CA capability parameter change to extend a capability of the at least one secondary cell.

4. The electronic device as claimed in claim 3, wherein the processor is configured to:
   determine a contribution of the primary cell when the number of CA configured UE does not meet the maximum CA configured UE threshold;
   determine whether the contribution of the primary cell meets a primary cell contribution threshold;

display no action required as higher Non-CA configured UE is available on the at least one secondary cell.

5. The electronic device as claimed in claim 4, wherein the processor is configured to:
determine a horizontal coverage mismatch when the contribution of the primary cell does not meet the primary cell contribution threshold; and
determine the mitigation plan for the at least one secondary cell based on the horizontal coverage mismatch, wherein the mitigation plan comprises configuring one of an antenna design, an antenna power, and an antenna orientation, wherein the horizontal coverage mismatch is determined based on a Timing advance of both the primary cell and the at least one secondary cell.

6. The electronic device as claimed in claim 4, wherein the processor is configured to:
determine a vertical coverage mismatch when the contribution of the primary cell does not meet the primary cell contribution threshold; and
determine the mitigation plan for the at least one secondary cell based on the vertical coverage mismatch, wherein the mitigation plan comprises an onsite visit to confirm antenna parameters, wherein the vertical coverage mismatch is determined based on a handover direction from cell-to-cell in the wireless network.

7. The electronic device as claimed in claim 1, wherein the processor is configured to:
determine a high-load cell plan for the at least one secondary cell with the high contribution, wherein the high-load cell plan is determined based on the CA offload ratio of the at least one secondary cell and a load level on the at least one secondary cell; and
display the high-load cell plan to be performed to optimize contribution of the at least one secondary cell in the wireless, wherein the high-load cell plan comprises at least one of addition of at least one new cell in the wireless network and a capacity planning of the at least one secondary cell.

8. A system for optimizing a contribution of at least one secondary cell under Carrier Aggregation (CA) in a wireless network, wherein the system comprises
a primary cell;
the at least one secondary cell connected to the at least one primary cell; and
an electronic device connected to the primary cell and the at least one secondary cell, wherein the electronic device comprises a processor, configured to:
receive a plurality of CA Key Performance Indicators (KPIs) of the at least one secondary cell for a period of time;
determine a CA offload ratio of the at least one secondary cell and a primary cell associated with the at least one secondary cell based on the plurality of CA KPIs;
determine whether the offload ratio is zero or meets an offload ratio threshold;
perform one of:
detect the at least one secondary cell has zero contribution in the wireless network when the offload ratio is zero;
detect the at least one secondary cell has a low contribution in the wireless network when the offload ratio meet the offload ratio threshold; and
detect the at least one secondary cell has high contribution in the wireless network when the offload ratio does not meet the offload ratio threshold; and
determine a mitigation plan for the at least one secondary cell with one of the zero contribution and the low contribution.

9. The system as claimed in claim 8, wherein:
the mitigation plan is determined based on the CA offload ratio of the at least one secondary cell and a load level on the at least one secondary cell; and
the electronic device is configured to display the mitigation plan to be performed to optimize the contribution of the at least one secondary cell in the wireless network, wherein the mitigation plan, for the at least one secondary cell with the zero contribution in the wireless network, comprises at least one of activation of Down Link (DL) CA by the at least one secondary cell, identifying unique relation between primary and secondary cell using the CA relation ID (CAREL).

10. The system as claimed in claim 9, wherein determine the mitigation plan for the at least one secondary cell with the low contribution in the wireless network comprises:
determine a load of the at least one secondary cell in the wireless network greater than a load threshold;
determine a number of CA configured User Equipment (UE) associated with the at least one secondary cell when the load of the at least one secondary cell in the wireless network is greater than the load threshold;
determine whether the number of CA configured UE meets a maximum CA configured UE threshold; and
determine the mitigation plan for the at least one secondary cell when the number of CA configured UE meets the maximum CA configured UE threshold, wherein the mitigation plan comprises an extended secondary cell CA capability parameter change to extend a capability of the at least one secondary cell.

11. The system as claimed in claim 10, wherein the electronic device is configured to:
determine a contribution of the primary cell when the number of CA configured UE does not meet the maximum CA configured UE threshold;
determine whether the contribution of the primary cell meets a primary cell contribution threshold; and
display no action required as higher Non-CA configured UE is available on the at least one secondary cell.

12. The system as claimed in claim 11, wherein the electronic device is configured to:
determine a horizontal coverage mismatch when the contribution of the primary cell does not meet the primary cell contribution threshold; and
determine the mitigation plan for the at least one secondary cell based on the horizontal coverage mismatch, wherein the mitigation plan comprises configuring one of an antenna design, an antenna power, and an antenna orientation, and wherein the horizontal coverage mismatch is determined based on a Timing advance of both the primary cell and the at least one secondary cell.

13. The system as claimed in claim 11, wherein the electronic device is configured to:
determine a vertical coverage mismatch when the contribution of the primary cell does not meet the primary cell contribution threshold; and
determine the mitigation plan for the at least one secondary cell based on the vertical coverage mismatch, wherein the mitigation plan comprises an onsite visit to confirm antenna parameters, and wherein the vertical coverage mismatch is determined based on a handover direction from cell to cell in the wireless network.

14. The system as claimed in claim 10, wherein the at least one secondary cell is configured to:

receive by the at least one secondary cell with one of the zero contribution or the low contribution the mitigation plan from the electronic device; and optimize the contribution of the at least one secondary cell in the wireless network by applying the mitigation plan at the at least one secondary cell, wherein apply the mitigation plan at the at least one secondary cell comprises:

a) at least one of activating a Down Link (DL) CA at the at least one secondary cell, checking CAREL; and limiting the CAREL due to cells not collocated, when the at least one secondary cell has zero contribution in the wireless network, b) extending secondary cell CA capability parameter change to extend a capability of the at least one secondary cell when the at least one secondary cell has the low contribution in the wireless network, and c) configuring one of an antenna design, an antenna power, and an antenna orientation when the at least one secondary cell has the low contribution in the wireless network.

15. The system as claimed in claim 8, wherein the electronic device is configured to:

determine a high-load cell plan for the at least one secondary cell with the high contribution, wherein the high-load cell plan is determined based on the CA offload ratio of the at least one secondary cell and a load level on the at least one secondary cell; and display the high-load cell plan to be performed to optimize contribution of the at least one secondary cell in the wireless network, wherein the high-load cell plan comprises at least one of addition of at least one new cell in the wireless network and a capacity planning of the at least one secondary cell, and wherein the at least one secondary cell with the high contribution is configured to:

receive the high-load cell plan from the electronic device; and optimize the contribution of the at least one secondary cell in the wireless network by applying the high-load cell plan at the at least one secondary cell.

16. The system as claimed in claim 8, wherein the system comprises a network device configured to:

monitor the plurality of KPIs associated with the at least one secondary cell over the period of time; and store the plurality of KPIs associated with the at least one secondary cell over the period of time in a database.

17. A method for optimizing a contribution of at least one secondary cell under Carrier Aggregation (CA) in a wireless network, wherein the method comprises receiving, by an electronic device, a plurality of CA Key Performance Indicators (KPIs) of the at least one secondary cell for a period of time;

determining, by the electronic device, a CA offload ratio of the at least one secondary cell and a primary cell associated with the at least one secondary cell based on the plurality of CA KPIs;

determining, by the electronic device, whether the offload ratio is zero or meets an offload ratio threshold;

performing, by the electronic device, one of:

detecting the at least one secondary cell has zero contribution in the wireless network when the offload ratio is zero;

detecting the at least one secondary cell has a low contribution in the wireless network when the offload ratio meet the offload ratio threshold; and detecting the at least one secondary cell has a high contribution in the wireless network when the offload ratio does not meet the offload ratio threshold; and determining, by the electronic device, a mitigation plan for the at least one secondary cell with one of the zero contribution and the low contribution.

18. The method as claimed in claim 17, wherein:

the mitigation plan is determined based on the CA offload ratio of the at least one secondary cell and a load level on the at least one secondary cell; and the method further comprises displaying, by the electronic device, the mitigation plan to be performed to optimize the contribution of the at least one secondary cell in the wireless network, wherein the mitigation plan, for the at least one secondary cell with the zero contribution in the wireless network, comprises at least one of activation of a Down Link (DL) CA by the at least one secondary cell, identifying a unique relation between primary and secondary cell using the CA relation ID (CAREL).

19. The method as claimed in claim 18, wherein determining, by the electronic device, the mitigation plan for the at least one secondary cell with the low contribution in the wireless network comprises:

determining, by the electronic device, a load of the at least one secondary cell in the wireless network greater than a load threshold;

determining, by the electronic device, a number of CA configured User Equipment (UE) associated with the at least one secondary cell when the load of the at least one secondary cell in the wireless network is greater than the load threshold;

determining, by the electronic device, whether the number of CA configured UE meets a maximum CA configured UE threshold; and determining, by the electronic device, the mitigation plan for the at least one secondary cell when the number of CA configured UE meets the maximum CA configured UE threshold, wherein the mitigation plan comprises an extended secondary cell CA capability parameter change to extend a capability of the at least one secondary cell.

20. The method as claimed in claim 19, wherein the method further comprises:

determining, by the electronic device, a contribution of the primary cell when the number of CA configured UE does not meet the maximum CA configured UE threshold;

determining, by the electronic device, whether the contribution of the primary cell meets a primary cell contribution threshold;

determining, by the electronic device, a horizontal coverage mismatch or a vertical coverage mismatch when the contribution of the primary cell does not meet the primary cell contribution threshold; and determining, by the electronic device, the mitigation plan for the at least one secondary cell based on the horizontal coverage mismatch or the vertical coverage mismatch.

* * * * *